(12) United States Patent
Hakola et al.

(10) Patent No.: US 8,504,052 B2
(45) Date of Patent: Aug. 6, 2013

(54) MEASUREMENTS AND FAST POWER ADJUSTMENTS IN D2D COMMUNICATIONS

(75) Inventors: Sami-Jukka Hakola, Kempele (FI); Timo K. Koskela, Oulu (FI); Gilles Charbit, Hampshire (GB); Vinh V. Phan, Oulu (FI)

(73) Assignee: Nokia Corporation, Espoo (FI)

( * ) Notice: Subject to any disclaimer, the term of this patent is extended or adjusted under 35 U.S.C. 154(b) by 423 days.

(21) Appl. No.: 12/774,994

(22) Filed: May 6, 2010

(65) Prior Publication Data

US 2011/0275382 A1 Nov. 10, 2011

(51) Int. Cl.
*H04W 72/00* (2009.01)

(52) U.S. Cl.
USPC .................................. 455/452.1; 455/452.2

(58) Field of Classification Search
USPC ........................................ 455/452.1, 452.2
See application file for complete search history.

(56) References Cited

U.S. PATENT DOCUMENTS

| | | | |
|---|---|---|---|
| 7,548,758 B2 | 6/2009 | Periyalwar et al. ............ | 455/517 |
| 2008/0031193 A1 | 2/2008 | Laroia et al. .................. | 370/331 |
| 2008/0069033 A1 | 3/2008 | Li et al. ........................ | 370/328 |
| 2009/0042593 A1 | 2/2009 | Yavuz et al. .................. | 455/522 |
| 2009/0259746 A1* | 10/2009 | Sasaki ........................... | 709/224 |
| 2010/0093364 A1 | 4/2010 | Ribeiro et al. ............. | 455/452.2 |
| 2010/0120397 A1* | 5/2010 | Kazmi et al. .................. | 455/410 |

FOREIGN PATENT DOCUMENTS

| | | |
|---|---|---|
| WO | WO 2007/082035 A2 | 7/2007 |
| WO | WO 2010/028307 A1 | 3/2010 |
| WO | WO 2010/049801 A1 | 5/2010 |

OTHER PUBLICATIONS

Doppler, K., et al.: Innovative Concepts in Peer-to-Peer and Network Coding. Version: 1.0, Last Updated: Jan. 16, 2009, pp. 1-25, http://projects.celtic-initiative.org/winner+/WINNER+%20Deliverables/D1.3_v1.pdf.

Janis, P., et al.: Interference-aware Resource Allocation for Device-to-Device Radio Underlaying Cellular Networks. pp. 1-5, ftp://lenst.det.unifi.it/pub/LenLar/proceedings/2009/vtc09/DATA/09-04-05.PDF.

Lei, J., Fu, X.: Interest-Based Peer-to-Peer Group Management (Abstract). Lecture Notes in Computer Science, vol. 5630/2009, http://www.springerlink.com/content/d2m175n30wp65508/.

Doppler, K., et al., "Mode Selection for Device-to-Device Communication Underlaying an LTE-Advanced Network", IEEE Wireless Communications and Networking Conference,(Apr. 18, 2010), (6 pages).

* cited by examiner

*Primary Examiner* — Kamran Afshar
*Assistant Examiner* — Omoniyi Obayanju
(74) *Attorney, Agent, or Firm* — Harrington & Smith

(57) ABSTRACT

At a cluster head/first device there is received, from each of at least two other devices with which the cluster head has a respective wireless link, a quality indicator for the respective link observed by the respective other device. The cluster head compiles those received quality indicators into a compressed report, and sends the compressed report to a network entity. In a specific embodiment the cluster head also determines an additional quality indicator of each of those respective links observed by the cluster head by listening to a sounding reference signal sent by the respective other device to the network entity on a PUCCH. Those additional quality indicators are also compiled into the compressed report, as are further quality indicators received from the devices for D2D links between pairs of those other devices that exclude the cluster head. The compressed report can inform how many indicators are above/below a threshold.

14 Claims, 7 Drawing Sheets

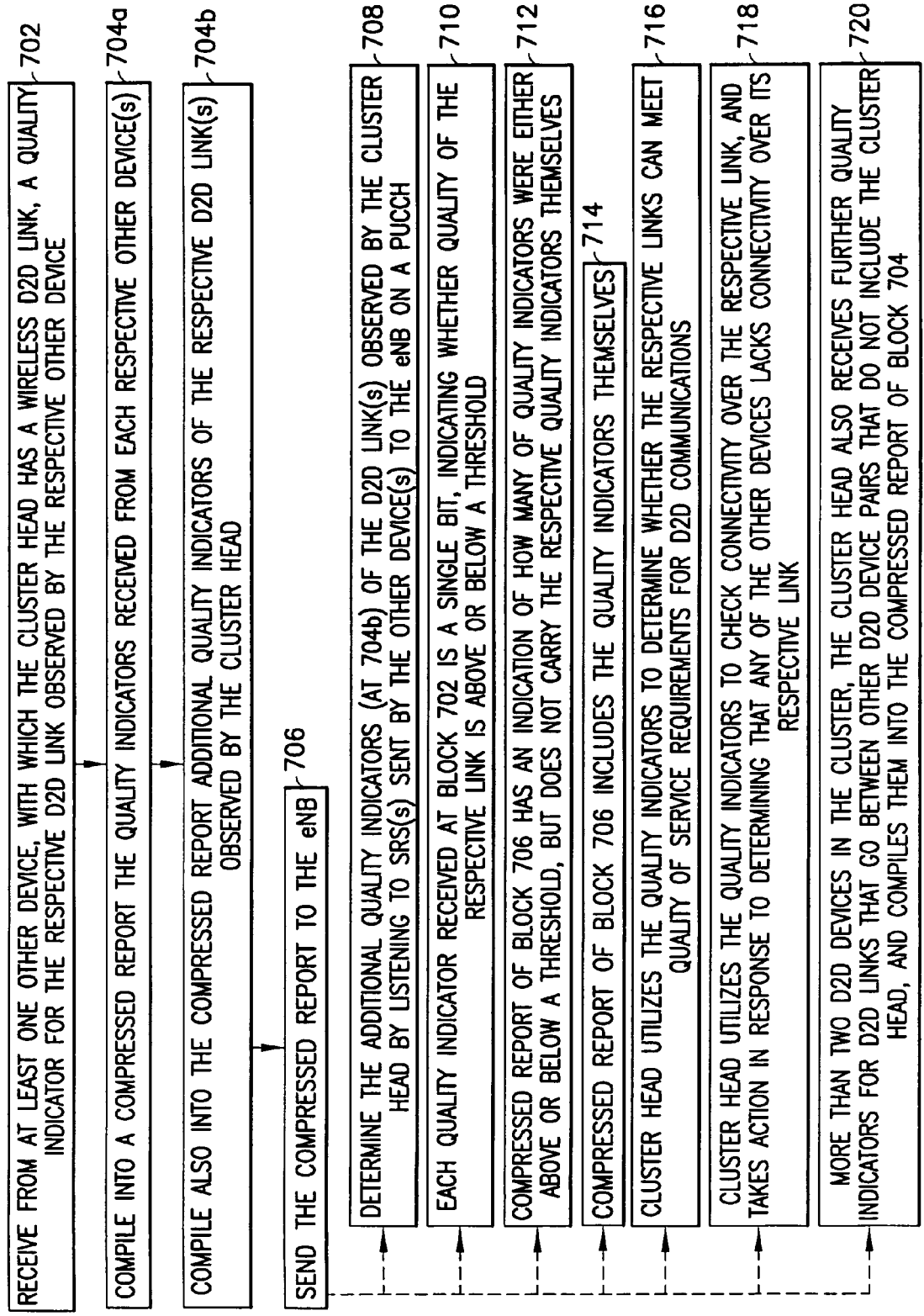

MEASUREMENTS AND FAST POWER ADJUSTMENTS IN D2D COMMUNICATIONS

TECHNICAL FIELD

The teachings herein relate generally to power considerations relevant to wireless device-to-device D2D communications.

BACKGROUND

The following abbreviations and terms are herewith defined:
  BS base station (e.g., any generic network access node)
  C-RNTI cell radio network temporary identifier
  D2D device-to-device
  DL downlink
  eNB base station in an LTE/LTE-A system
  E-UTRAN evolved UTRAN
  LTE long term evolution of UTRAN (also known as 3.9G)
  LTE-A LTE advanced
  OFDM orthogonal frequency division multiplex
  PRB physical resource block
  QoS quality of service
  RRM radio resource management
  SRS sounding reference signal
  TTI transmission time interval
  UE user equipment (e.g., mobile or subscriber station SS/MS, terminal)
  UL uplink
  UMTS universal mobile telecommunications system
  UTRAN UMTS terrestrial radio access network
  WiMAX worldwide interoperability for microwave access The future development of wireless communication systems are trending toward integrating network topologies rather than having multiple networks using different protocols overlying one another in the same geographic space. For example, there is some research in both industry and the academy into heterogeneous networks that are a deployment of macro, micro, pico, and/or femto cells and using relay nodes in the same LTE/LTE-A cellular overlay topology to all exploit the same radio spectrum. Another area of research in this integration concept is to allow direct communication between user devices when they are close to one another. This is often referred to as device-to-device D2D communications, and unlike cognitive radio which exploits spectrum 'holes' that go unused by the cellular scheduling entity, D2D communications use licensed radio spectrum that is specifically allocated by the cellular network. One likely implementation for D2D is within a 'home' cell. Proposals for D2D variously are within WiMAX, HiperLAN 2, and Tetra protocols, to name a few non-limiting examples.

D2D communication may also have characteristics of more general machine-to-machine (M2M) communication where machines communicate directly with each other under supervision of cellular network and sharing the radio resources with cellular users. D2D communication may provide efficient solutions also for local M2M communication schemes in the future. A typically assumption for D2D communications is that the D2D links utilize uplink UL radio resources of the cellular system controlled by the eNB/E-UTRAN.

A problem arises in power control for D2D communications in that different radio resource management RRM functions which are optimized with accurate power measurements or power control commands have different time latencies. Decisions by the cellular network as to what specific radio resources to allocate to the D2D links have a high latency and might be affected by power density available for those links. Communications on the D2D links themselves require more immediate power control so the D2D devices receive signals from the network and from the other D2D device(s) at a similar receive power level to avoid the near/far problem in code division multiplexed systems.

In traditional LTE systems, sounding reference signals (SRSs) are sent on the last SC-FDMA symbol in an UL subframe, if SRS is configured for the sending UE by higher layer signaling. The SRS can occupy a bandwidth different from that used for data transmission. UEs transmitting SRS in the same subframe can be multiplexed via either frequency or code division multiplexing. The subframes in which SRS are transmitted by any UE within the cell are indicated by cell-specific broadcast signaling. The eNB may either request or configure a UE to transmit SRS periodically until terminated. Specifically, in LTE there is a 1-bit UE-specific signaling parameter, 'duration', which indicates whether the requested SRS transmission is single or periodic. This of course is for cellular communication, not D2D which is not a part of LTE.

Relevant to D2D communications, one particular approach for power control is in a co-owned US patent application entitled "METHOD AND APPARATUS FOR PROVIDING INTERFERENCE MEASUREMENTS FOR DEVICE-TO-DEVICE COMMUNICATION" (Ser. No. 12/558,463, filed on Sep. 11, 2009). In that reference the base station determines the D2D pathloss or expected level of interference by requesting the devices to perform interference power measurements. Then the pathloss or interference estimates can be used for coordinating the D2D and cellular communication mode transmission on the same band. Examples include the eNB giving a list of C-RNTIs to the D2D devices which follow DL PDCCHs to find corresponding resources for the identifiers, and the D2D devices measure power density when they find a grant for certain resources with a listed identity. The eNB then finds the relevant scheduling restrictions and uses the information to suppress interference between the cellular and D2D communications. Another example finds the eNB providing a list of resources rather than the list of identifiers.

The non-limiting examples detailed below exhibit a more comprehensive power measurement and power control approach that is particularly useful for D2D communications, though of course not limited only to D2D links.

SUMMARY

In a first aspect the exemplary embodiments of the invention provide a method comprising: receiving, from each of at least two other devices with which a first device has a wireless device-to-device link, a quality indicator for the respective link observed by the respective other device; the first device compiling, into a compressed report, the quality indicators received from each of the respective other devices; and the first device sending the compressed report to a network entity.

In a second aspect the exemplary embodiments of the invention provide a computer readable storage medium storing a program of computer readable instructions that when executed by at least one processor result in actions comprising: receiving, from each of at least two other devices with which a first device has a wireless device-to-device link, a quality indicator for the respective link observed by the respective other device; compiling into a compressed report the quality indicators received from each of the respective other devices; and sending the compressed report to a network entity.

In a third aspect the exemplary embodiments of the invention provide an apparatus comprising at least one processor and at least one memory storing computer instructions. In this third aspect the at least one memory with the computer instructions are configured, with the at least one processor, to cause the apparatus at least to receive, from each of at least two other devices with which the apparatus has a wireless device-to-device link, a quality indicator for the respective link observed by the respective other device; compile into a compressed report the quality indicators received from each of the respective other devices; and send the compressed report to a network entity.

In a fourth aspect the exemplary embodiments of the invention provide an apparatus comprising at least one processor and at least one memory storing computer instructions. In this fourth aspect the at least one memory with the computer instructions are configured, with the at least one processor, to cause the apparatus at least to determine channel quality on a wireless link between a first device and a second device from signaling sent from the first device to a network access node; and to cause an adjustment to transmit power by the second device for a transmission to the first device using the determined channel quality. This fourth aspect may also be embodied as a method and/or as a computer readable storage medium storing a program of computer readable instructions.

These and other more particular aspects are detailed below with particularity.

BRIEF DESCRIPTION OF THE DRAWINGS

The foregoing and other aspects of these teachings are made more evident in the following Detailed Description, when read in conjunction with the attached Drawing Figures.

FIGS. 6-7 are logic flow diagrams that illustrate the operation of methods, and a result of execution of computer program instructions embodied on computer readable memories, in accordance with the exemplary embodiments of this invention.

DETAILED DESCRIPTION

Figure 1:
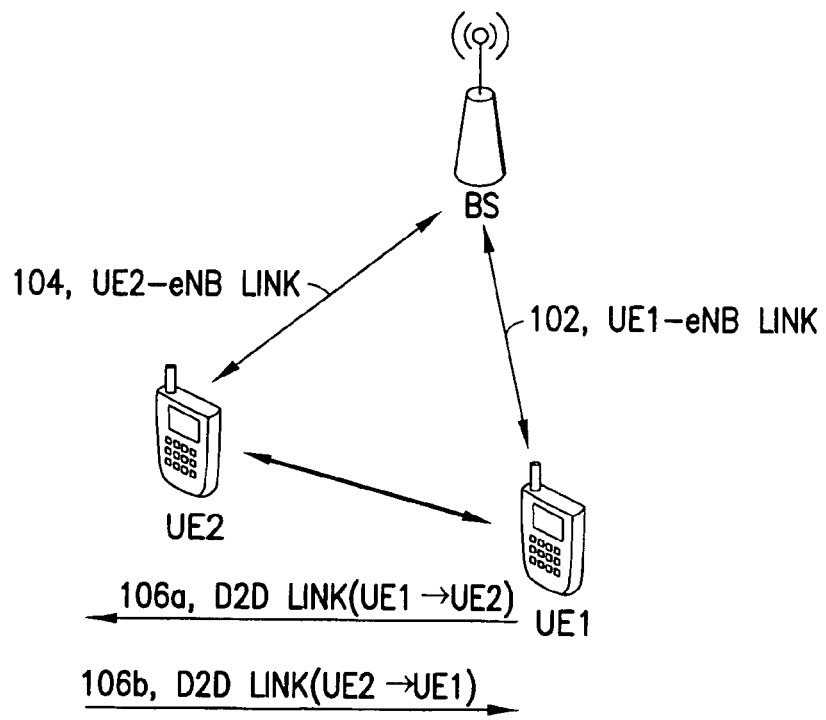
FIG. 1 is a schematic diagram showing two devices in communication with a network base station and with one another (D2D).

For ready reference to the more detailed descriptions below, FIG. 1 illustrates the general arrangement of a network access node or BS relative to the UEs which engage in D2D communications. The description below uses examples of D2D 'pairs' shown at FIG. 1 as UE1 and UE2. The 'pair' terminology is for clarity of explanation and any D2D 'pair' detailed below may include more than only two UE devices engaging in D2D communications among themselves. The link between UE1 and the BS is shown as 102 in FIG. 1, and the link between UE2 and the BS is shown there as 104. Where relevant, direction for those links 102, 104 is stated below as UL or DL. The D2D link can be considered as two different links depending on direction. FIG. 1 shows the D2D link from UE1 to UE2 as 106a, abbreviated below as D2D (1→2). FIG. 1 also shows the D2D link from UE2 to UE1 as 106b, abbreviated below as D2D (2→1). In any given implementation there may be a relay in place of the BS/eNB (or operatively between UE1 and/or UE2 and the eNB) without changing these teachings. "Higher layer signaling" noted in the description means the signaling originates from either logical layers in the network that are higher than the physical layer (such as the L1 radio resource control layer), or from an entity higher in the network hierarchy than the BS (such as a controller of multiple BSs). Such higher layer signaling may be passed through the physical layer of the BS without changing that such signaling is higher layer signaling.

Figure 2:
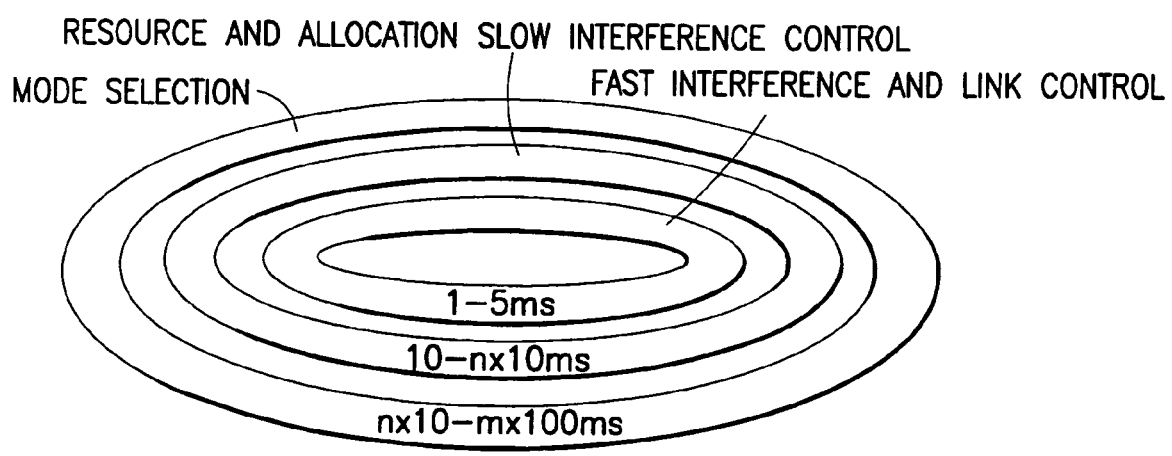
FIG. 2 is a conceptual diagram showing relative latency time for different functions necessary for efficient communications over the links shown at FIG. 1.
Figure 4:
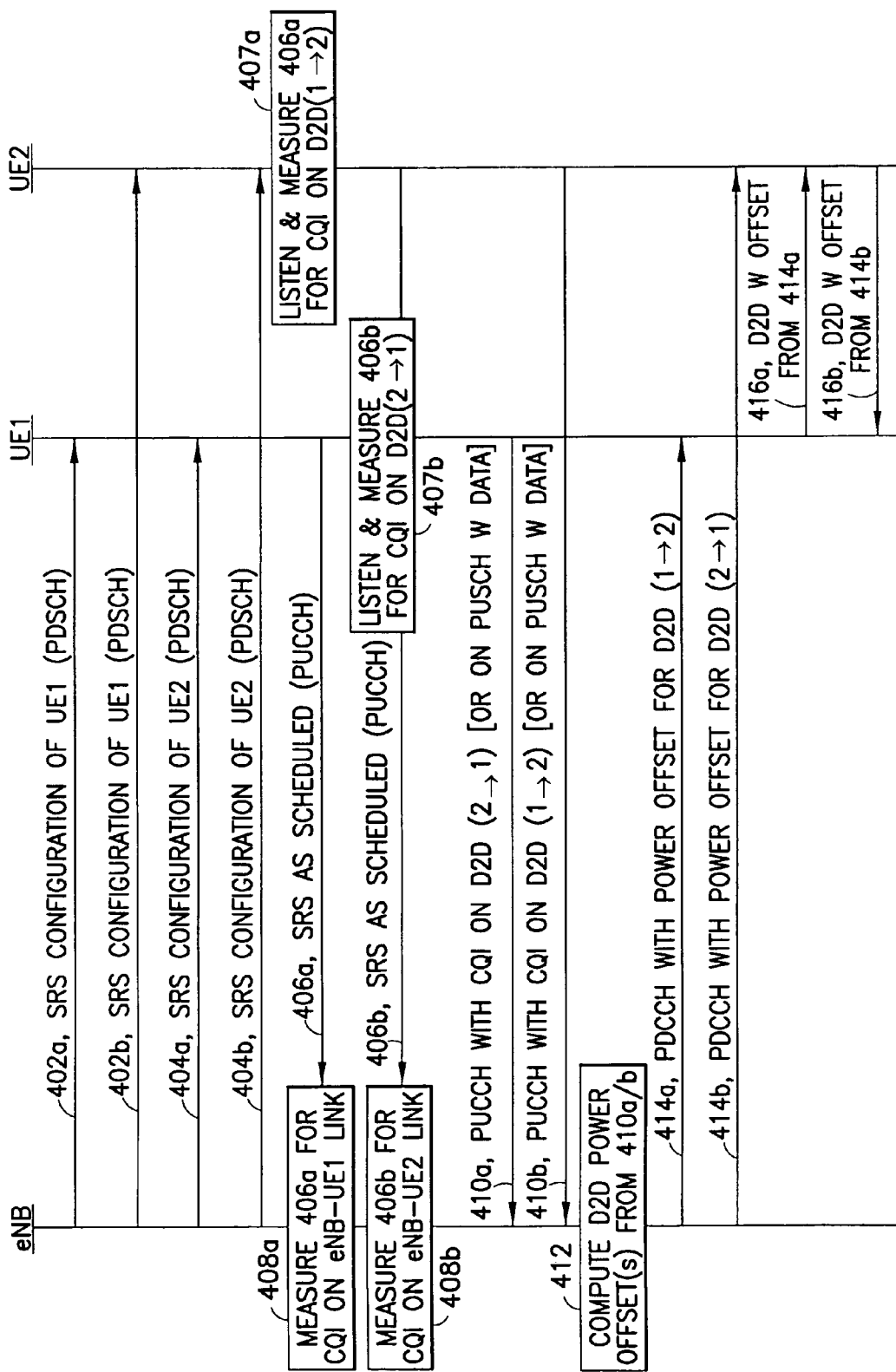
FIG. 4 is a signaling diagram between the three nodes shown at FIG. 1 for carrying out power control according to an exemplary embodiment of the invention.

FIG. 2 illustrates schematically the different latencies for certain different RRM functionalities related to network controlled D2D operation. In FIG. 4 there are separate indications for mode selection, radio resource allocation, slow interference control, and fast interference and link control. In the communication mode selection the network evaluates and decides whether communicating devices shall have direct communication mode (D2D) or conventional cellular communication mode. Because the mode change involves for example synchronization of the protocols and buffers of RLC and PDCP layers, it is necessary to avoid frequent mode changes back and forth. Mode change may be compared to a cellular handover; it is important that once a handover occurs some slight change in relative signal strength does not cause another handover back to the original serving cell. The mode selection procedure is therefore rather slow and should be based on slowly changing conditions related to the D2D connection. FIG. 2 shows it on the order of tens to hundreds of milliseconds, which is not a limiting constraint but simply for relative comparison with other latencies.

The resource allocation and slow interference control are methods by the eNB to control the D2D connection among cellular and other D2D users. These mechanisms require supporting signaling between the eNB and the D2D pair. Signaling between D2D pair and the eNB reduces efficiency from the D2D communication, because simultaneous control/data transmission to the eNB and to the other D2D device in the pair may not be practical. Thus it may not be feasible to perform resource allocations (scheduling) for the D2D pair as fast as resources are allocated to the cellular users. In practice the semi-persistent scheduling would seem to be the most practical from a scheduling and resource allocation point of view. Regardless, the resource allocation ring of FIG. 2 shows latency on the order of ten to many tens of milliseconds for relative comparison.

In order to combat fast-changing interference at the D2D receiver (which mainly will be due to dynamic scheduling in neighbor cells), there should be D2D pair specific methods in which the eNB is not directly involved. Those are referred to in FIG. 2 as fast interference and link control, and relative latency for fast interference and link control is shown at FIG. 2 on the order of less than ten milliseconds (1-5 ms).

Figure 3A:
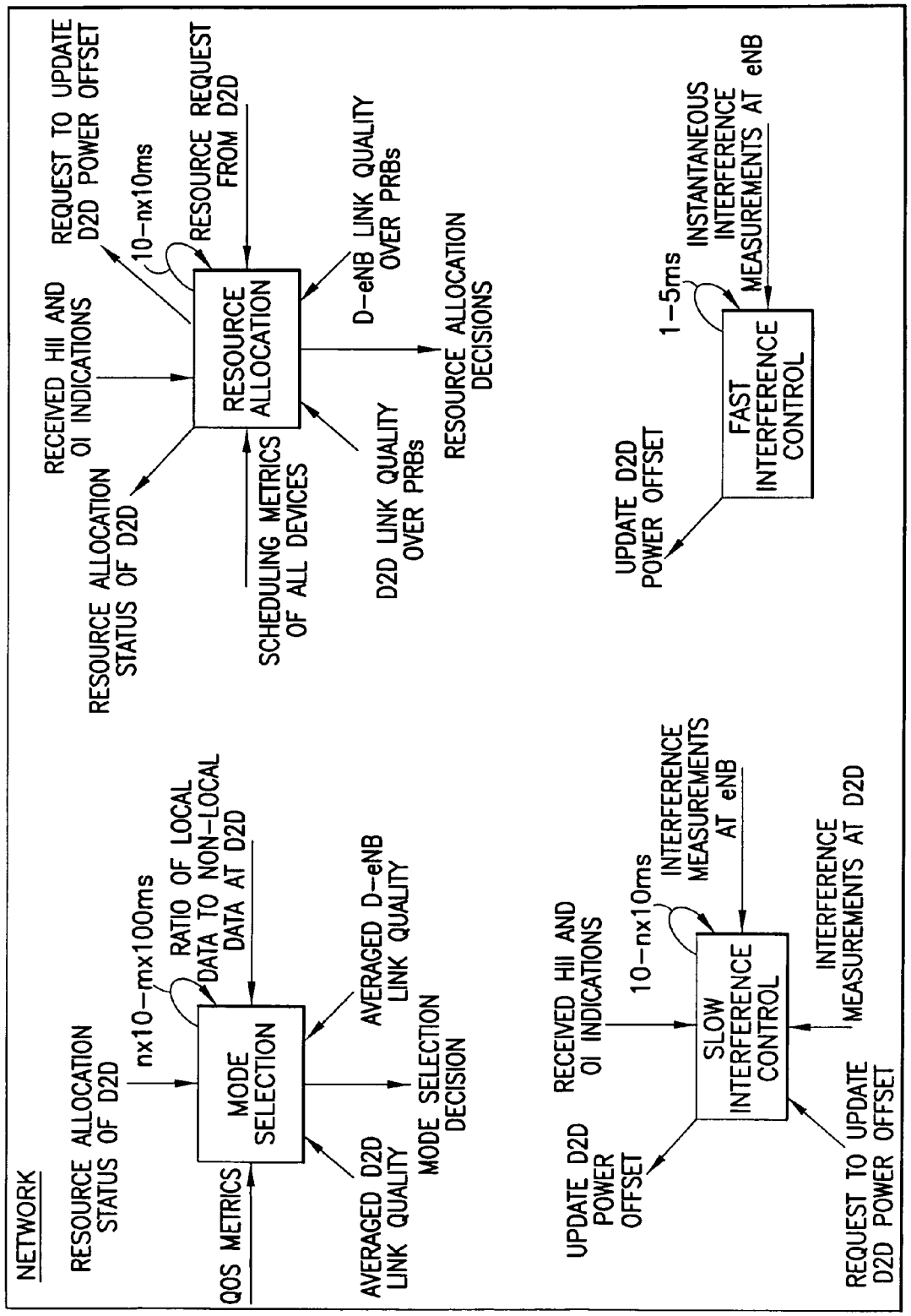
FIGS. 3a-b are flow diagrams for respective network and device of FIG. 1 showing inputs needed for the various functions of FIG. 2 to generate the function's desired output.
Figure 3B:
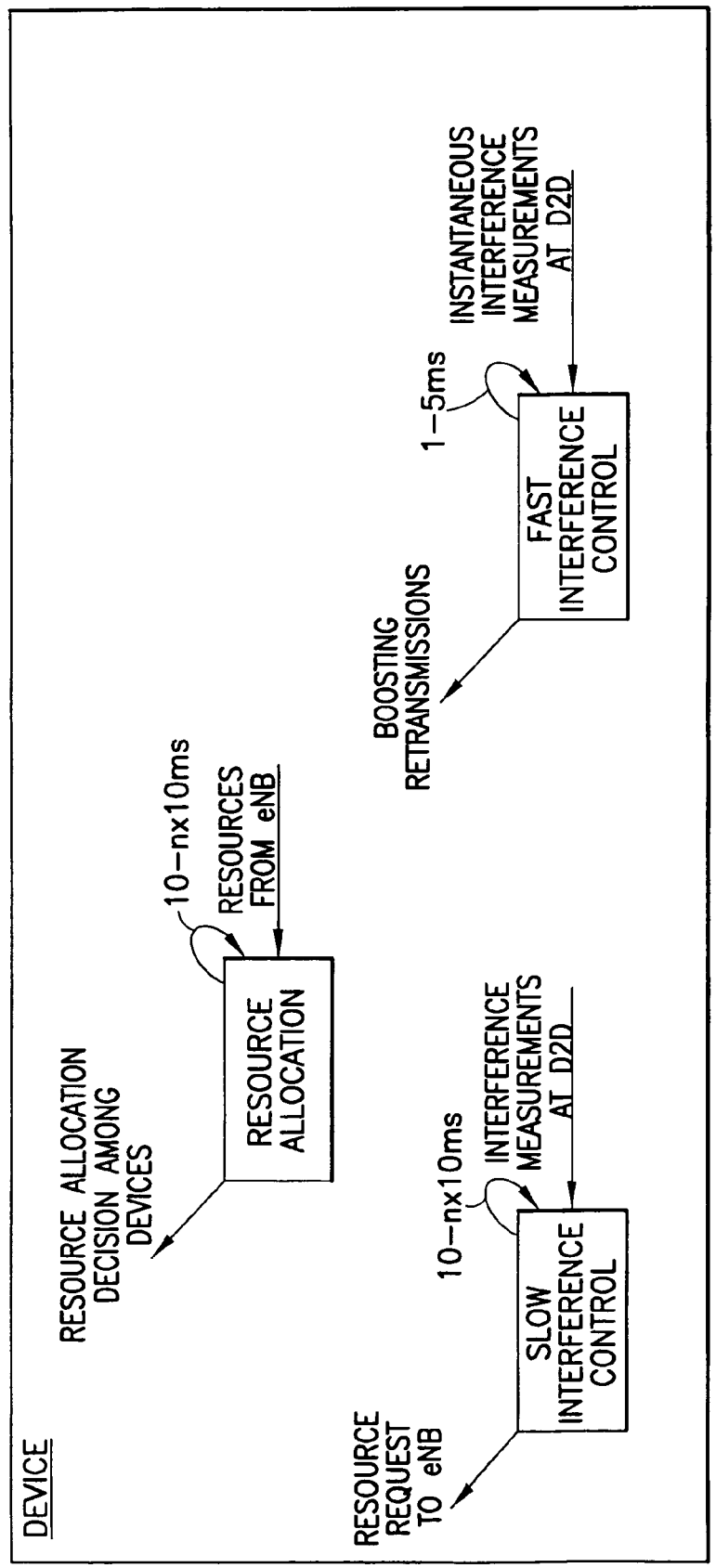

Certain of the functions summarized for FIG. 2 can be divided into operations performed on the network side as shown at FIG. 3a, and on the device (D2D pair) side as shown at FIG. 3b. These figures also indicate the main inputs and outputs of the functions.

Specifically, from the network's perspective at FIG. 3a, mode selection requires inputs of QoS metrics, status of the D2D resource allocation, ratio of local data to non-local data at the D2D links, averaged D2D link quality, and averaged UE-eNB link quality. From these the mode selection function outputs the mode selection decision. The resource allocation function uses inputs of scheduling metrics for all devices, received high interference indicator HII and overload indicator OI, D2D resource requests, D2D link quality over some number of PRBs, and UE-eNB link quality over those PRBs to output the resource allocation decision. For UL interference control and coordination in LTE, the load indication message sent between eNBs on the X2 interface can include the HII and the OI to facilitate coordinating transmit power and scheduling of UEs. OI may be considered a reactive indicator, in that it indicates physical layer measurements of the average UL interference plus thermal noise for each PRB (three values for OI in LTE: low, medium and high). On the other hand, HII can be considered a proactive indicator in that it informs neighbor eNBs that the sending eNB will in the near future schedule UL radio resources for one or more cell-edge UEs, which the neighbor eNBs can use in scheduling their own UEs to help limit any interference. The slow interference control function at the network side takes inputs of received HII and OI indications, interference measurements at the eNB, interference measurements of the D2D links as well as any requests to update the D2D power offset to output the power offset for the D2D links. And finally the network's fast interference control function takes a measurement of instantaneous interference at the eNB to output an update to the D2D power offset.

From the UE perspective at FIG. 3b the UE's resource allocation function takes the resources given by the eNB as an input to output the resource allocation decision among the D2D devices. The UE's slow interference control function takes its interference measurements at the D2D link to output a resource request to the eNB, and the UE's fast interference control function takes instantaneous interference measurements at the D2D links as input so as to output any power boosting required for re-transmissions.

In FIGS. 3a-b, darker input arrows refer to measurement results to be used in every level of RRM functions. This means that the measurement results are needed both in high and low rate RRM functions. As will be seen in the examples below, embodiments of the invention provide an efficient and practical measurement procedure that could be utilized in every level of RRM functions. These examples are presented in the context of D2D communication within the LTE overlay, but LTE is simply the vehicle used to fully explain the invention and is not a limitation to how/where the invention may be utilized.

In LTE Release 8/9, the UEs send sounding reference signals to the eNB which enables the eNB can accurately measure the UL channel on which it receives those SRSs. Exemplary embodiments detailed herein adapt a similar SRS procedure for use in power control for D2D communications.

In an exemplary embodiment of the invention, there is higher-layer signaling of an SRS configuration for the D2D device pair. This is shown in the exemplary signaling diagram at FIG. 4 by example at messages 402a and 404b. At 402a the eNB sends the SRS configuration of UE1 to UE1. At 404b the eNB sends the SRS configuration of UE2 to UE2. To support power control in D2D communications as will be described further below, the eNB also sends at message 402b the SRS configuration of UE1 to UE2, and sends message 404a with the SRS configuration of UE2 to UE1. In this manner the network access node/eNB configures both UE1 and UE2 for SRSs, and informs each of them of the SRS configuration of the other UE. All of this is done by example on the PDSCH, but alternatively the configurations may be sent on the PDCCH.

By example the measurement configuration for D2D pair could indicate the resources and order for the devices to perform a sounding procedure including transmission combining, starting PRB assignment, duration of the SRS, SRS bandwidth, frequency hopping bandwidth, and cyclic shift. The eNB signals the SRS configuration of the two devices in the pair to each device in the pair by higher-layer signaling. This allows the devices UE1, UE2 in the pair to (i) transmit a sounding signal to the eNB in the configured resources for the device—eNB links 102, 104 to enable channel measurements by the eNB receiver, and (ii) to receive and detect the sounding signal transmitted by the other device in the pair for D2D link channel measurements at the D2D device receiver.

The first of the above two measurements is shown at FIG. 4 beginning with UE1 sending message 406a to the eNB, where message 406a has an SRS for which UE1 was configured via message 402a. The eNB receives message 406a and uses the SRS in it to measure at block 408a the UL eNB-UE1 channel 102. By example FIG. 4 shows the eNB measuring channel quality and arriving at a CQI for the eNB-UE1 UL channel 102 but other metrics for channel quality may be used instead as is known in the wireless arts.

Since UE2 also has the SRS configuration of UE1 from message 402b, at block 407a UE2 also tunes to the resources that UE1 uses to send message 406a and measures the CQI or other quality metric using the SRS sent by UE1. Since UE2 hears message 406a directly from UE1, the CQI that UE2 measures at block 407a is for the D2D (UE1→UE2) link 106a.

Similarly at FIG. 4, UE2 sends message 406b to the eNB, where message 406b has an SRS for which UE2 was configured via message 404b. The eNB receives message 406b and uses the SRS in it to measure at block 408b the CQI on the UL eNB-UE2 channel 104. Since UE1 also has the SRS configuration of UE2 from message 404a, at block 407b UE1 also tunes to the resources that UE2 uses to send message 406b and measures the CQI or other quality metric using the SRS sent by UE2. Since UE1 hears message 406b directly from UE2, the CQI that UE1 measures at block 407b is for the D2D (UE2→UE1) link 106b.

Further at FIG. 4 the CQIs for the D2D links are then accumulated at the eNB. At message 410a, UE1 sends the CQI it measured at block 407b for the D2D (UE2→UE1) link 106b to the eNB on a PUCCH. At message 410b, UE2 sends the CQI it measured at block 407a for the D2D (UE1→UE2) link 106a to the eNB on a PUCCH. Alternatively, either or both of these messages 410a, 410b may be sent on a PUSCH where the respective CQI is included with the UE's UL data.

However the eNB receives them, based on those two different D2D link CQIs the eNB computes at block 412 a power offset for the D2D links (D2D power offset), which in an exemplary embodiment will be the same offset for both opposed D2D links between the same UE pair UE1, UE2. At messages 414a and 414b the eNB distributes the D2D power offset that it computed to the UEs. FIG. 4 shows the specific case in which the power offsets for the opposed D2D links are different; the eNB only needs to distribute the relevant power offset to the respective one of the UEs that is to transmit on that D2D link. At messages 416a UE1 transmits on the D2D (UE1→UE2) link 106a with the power offset for that link which it received at message 414a. Similarly at messages 416b UE2 transmits on the D2D (UE2→UE1) link 106b with the power offset for that link which it received at message 414b.

The eNB computes the D2D transmission power offset for UL D2D transmission power control to allow maximum D2D transmission power without creating interference to UL cellular transmissions. This may allow spatial re-use of resources for simultaneous D2D and cellular communications on the UL. In an exemplary embodiment there is a new DCI format to indicate the D2D transmission power offset by PDCCH at messages 414a, 414b.

SRS-based UL power control for the device pair. In the network controlled D2D operation such as that shown by example at FIG. 4, it can be assumed that the eNB/network configures the measurement procedure for the D2D pair. Furthermore, the D2D devices UE1, UE2 would follow certain power control algorithm and rules known and parameterized by the eNB in order to control interference from D2D communications at the eNB's own receiver as well as at neighbor cells' receivers. In accordance with an embodiment of the invention, the D2D devices UE1, UE2 implement an uplink power control algorithm (which may even be a prior art procedure such as the LTE Release 8/9 power control algorithm). But in this exemplary embodiment the eNB configures an additional power offset, D2D_power_offset, to control the contribution of the certain D2D pair into the cumulative interference seen by the eNB.

As an example consider the following general definitions for power settings:
 power_in_cellular_mode~P_0+PL;
 power_in_SRS_transmission~P_0+PL+SRS_offset;
 power_in_D2D_mode~P_0+PL+D2D_power_offset;
where P_0 is the base power setting, PL is the path loss between the device UE1 or UE2 and the serving eNB, SRS_offset is controlled by the eNB so its received power from multiple UEs is roughly equal, and D2D_power_offset is described at FIG. 4 but as defined immediately above power_in_D2D_mode takes into account the cumulative power seen by the eNB. SRS_offset could be set similarly to cellular users to allow the same level of received power at the eNB for cellular and D2D users, as further detailed below.

The power for the sounding transmission 406a, 406b shall be set as in the cellular mode to reach the eNB, and to prevent near-far problem at eNB as the sounding symbols that the D2D devices UE1, UE2 are sending can be (or can be allowed to be) multiplexed with cellular users via code division multiplexing (for example using a cyclic shift configuration). In addition, in an exemplary embodiment the eNB shall be aware of the path loss of each D2D device UE1, UE2 towards the eNB in order to calculate on how many PRBs the device UE1, UE2 can transmit 406a, 406b SRS symbols simultaneously. As an alternative exemplary embodiment, the D2D devices UE1, UE2 indicate information to the eNB about the number of PRBs they can transmit on with the current SRS_offset value.

In an exemplary embodiment the D2D sounding procedure could also be used for fast power adjustment by the eNB. When a D2D pair UE1, UE2 is using the uplink resources for their D2D communications, the D2D devices UE1, UE2 can listen to the downlink resources continuously. After a certain number of slots/TTIs during which the D2D devices UE1, UE2 have transmitted their SRS, in an exemplary embodiment there are downlink fast power control commands sent on the PDCCH by the eNB to decrease transmission power if needed. This is because by sending their SRS, the eNB knows exactly the amount of interference seen by the eNB is contributed by that D2D pair UE1, UE2. The eNB can differentiate any D2D contribution to interference from inter-cell interference, as well as from other intra-cell D2D pairs and from cellular users sending on the same resource, by measuring the energy of the received symbol with a certain cyclic shift that the eNB has given to the D2D devices UE1, UE2. The end result of this is that the SRSs that are used for the fast power adjustment will need to include the resources that the D2D pair UE1, UE2 is using currently.

Multi-device-pair extension of the D2D measurement procedure. To implement and control the reuse of the radio resources among multiple D2D pairs, in an exemplary embodiment the eNB configures multiple D2D pairs for the same measurement procedure, so that other D2D pairs measure the SRSs sent by one D2D pair at a time to identify which D2D pairs could use the same resources. By example this would mean that FIG. 4 is extended so that the eNB sends the SRS configurations of UE1 and UE2 to UE3 and UE4 which are engaging in D2D communications separate and distinct from UE1 and UE2. UE3 and UE4 then measure the inter-pair CQIs they see and report that information to the eNB. UE1 and UE2 would also be given the SRS configurations for UE3 and UE4, and measure and report similarly. The eNB would use the additional information provided by all four UEs on the inter-pair channel quality to decide if the UE1-UE2 pair can use the same resources for D2D communications as UE3 and UE4.

Multi-cell extension of the D2D measurement procedure. Consider now the case of multicell D2D, where devices are attached in cellular mode to different eNBs such that UE1 and UE2 are controlled by different serving eNBs. In this case according to an exemplary embodiment of the invention the X2 interface between neighbor eNBs is used to negotiate about the measurement procedure among the eNBs to which the devices UE1, UE2 are attached. In an alternative exemplary embodiment for multi-cell procedures, the eNBs use the X2 interface to indicate to their neighbor eNBs information about their configured D2D measurement procedure so that the informed eNBs could also measure SRSs from the D2D pair at their own receivers. An advantage of this alternative embodiment is that for the case where the D2D pair is communicating in a transportation vehicle (such as a bus or train for example), changing the serving cell for the D2D pair becomes simpler in that the serving eNB can provide measurement support for the handover process of the D2D pair UE1, UE2 to the target eNB.

D2D measurement reporting to the eNB. Recall from FIG. 4 that the UE's quality measurements were reported on PUCCH or PUSCH resources at messages 410a, 410b. In an embodiment of the invention where PUCCH resources are used for this reporting, those PUCCH resources are implicitly mapped to the measurement configuration for the reporting D2D device pair UE1, UE2. Above it was mentioned that describing in the context of D2D device pairs was not limiting. Where there are more than two D2D devices communicating among themselves directly on D2D links, such a grouping of D2D devices is referred to as a cluster of D2D devices. In an alternative embodiment those PUCCH resources are allocated to the cluster head, which is the D2D device which first combines the clustered D2D device measurements and then reports them to the eNB in a 'compressed' report as opposed to each D2D device sending to the eNB its own individual report. The D2D measurements may be encoded into an efficient D2D CQI format based on a history of D2D measurements, as further detailed below. In an exemplary embodiment the eNB can configure how many SRS symbols are bundled and averaged together by the UEs from which the measurement report bearing the CQI is generated. For example, the eNB may setup an on-demand measurement procedure such that it is only used for the various functions shown at FIG. 3a: for resource allocation, fast interference control or mode selection purposes. Each of those different on-demand purposes would utilize the same procedure but with a different averaging period or different number of SRS symbols.

Whether or not the multi-device pair and multi-cell extensions noted above are included, exemplary embodiments of the invention as described with reference to FIG. 4 can be summarized as using a compressed measurement procedure for the D2D communication integrated into a cellular network by reusing the LTE Release 8/9 SRS transmissions with D2D-specific transmission power settings for the D2D link as well as the links between the individual D2D devices and the eNB which are measured simultaneously. These D2D power settings can be used for interference control, resource allocation, fast D2D power adjustment by the network, D2D control and coordination purposes, and also for joint scheduling among D2D and cellular users.

The compressed measurement reporting methods 410a, 410b shown at FIG. 4 by the members UE1, UE2 of the D2D pair (or by the D2D cluster noted above) limit the required signaling between the D2D devices and the cellular network.

The setting of D2D power offset is done by the higher layer signaling initial setup and event-based control, whereas in an exemplary embodiment the fast power control is done by a new D2D transmission power control (TPC) command sent in a new D2D DCI format noted above on the PDCCH at messages 414a, 414b during normal D2D operation. When the D2D UEs utilizing an UL cellular band for their D2D links moves closer to a nearby eNB, the power TPC command alone might not be enough to ensure the D2D transmission does not cause near-far interference to cellular UL transmissions received at the eNB receiver. In this scenario, the eNB may have to assign a new D2D offset via higher-layer signaling. This is seen to be more likely to be triggered in a (heterogeneous) pico-micro-macro mixed multi-cell D2D environment.

Recall from above the concept of clustered D2D devices. In case of a D2D pair there is only a single link (two CQls in opposed link directions) to be measured but in case clusters with multiple members (and thus several links) the reporting overhead may become quite high. Consider for example a cluster having four D2D device members. Such a cluster would have a total of six distinct D2D links, meaning there is a total of twelve CQl values to report. If the cluster had five members there would be ten distinct links and twenty CQl values to report. To alleviate this, the channel quality reporting could be reduced in one exemplary embodiment by the cluster members comparing the received transmission quality to a predefined threshold (threshold CQl) and report the measurement using only a single bit: one value for the measured CQl being above the threshold and the opposite bit value if the measured CQl is below the value. Such a one-bit reporting for each measurement reduces the reporting overhead greatly. The eNB or alternatively the cluster head then combines the reports and determines for example whether the link qualities in the cluster can meet the quality of service requirements, and/or the measurement reports can be used to check the connectivity of the D2D devices on the various D2D links. In an exemplary embodiment reporting can be further reduced for example by informing the eNB only of how many measurements were above or below the threshold.

In another embodiment for clustered D2D devices, reporting overhead is reduced using a traffic based measurement procedure. For example, if a single cluster member is sharing a file over the D2D links to other members, only the links with the file sharer should be reported.

Further in the clustered D2D device scenario, in an exemplary embodiment the measurement report serves also as a trigger for cluster management. Specifically, with the help of the measurement reports the eNB can determine the connectivity within the cluster itself and use the link quality measurements to find out if some members have bad links with other members. The measurement frequency (how often the reference symbols are transmitted, such as messages 406a and 406b) can also be configured so that the overhead is reasonable.

UL timing alignment and SRS receive window timing in multi-cell scenario. D2D devices UE1 and UE2 typically may be assumed to be within D2D transmission range of about 100 meters or so. In case they are DL synchronized to the same eNB, they can be assumed to have a similar timing advance (TA) parameter, where 100 m corresponds roughly to $10 \times Ts = 0.33$ us, and the TA resolution is specified to be $16 \times Ts$. UE2 can advance its UL receive widow timing by the TA/2 to receive the SRS from UE1. The TA/2 factor is due to the TA corresponding to the round trip time (RTT)=2*propagation delay between the D2D device and the eNB.

But in case D2D devices UE1 and UE2 are attached to different eNBs, this general approach can be made to still work since the UL receive widow timing is aligned within a cyclic prefix of the SRS symbol (=$144 \times Ts$). There may be scenarios where the UEs are in cells of widely different eNB cell sizes, for example a micro eNB cell and a pico eNB cell. The different TA commands will then cause some timing misalignment for the SRS receive window. Following are two embodiments to solve that timing misalignment. First, the D2D CQl can be based on measurements from D2D device transmissions in D2D mode, as opposed to being based on the SRS as in FIG. 4. Examples of the D2D mode transmissions include the D2D PDSCH, or D2D control signaling with a D2D reference signal. This first solution assumes that the other D2D device UE2 is transmitting some data or signaling to the first D2D device UE1 (or devices if clustered), in addition to the SRS for the UE2-eNB link channel quality measurements A second exemplary solution is to make the SRS detection window larger in the D2D device receiver. In this instance the SRS signal receive timing would be determined by using a correlator in the time domain, followed by post fast Fourier transform (FFT) processing of the SRS to detect the D2D link channel quality. In addition, UE1 may not receive any other D2D signals from UE2 in the left adjacent SC-FDM symbol(s) #12, #11, . . . in the UL subframe that contains the SRS, depending on the eNB cell size and the network synchronization. In that case the SRS in SC-FDMA symbol #13 may be received in both multi-cells with reasonable effort for the D2D receiver implementation. This second solution exhibits some loss of SC-FDM symbols in the UL subframe that contains the SRS, but does not require additional D2D device transmissions for D2D CQl measurements.

Certain exemplary embodiments of the invention exhibit the technical effect of an efficient and practical measurement scheme for network controlled D2D operation, and reduced UL control signaling payload at least in multi-pair scenarios, and which is adaptable for various different rate RRM functions while still mitigating D2D near-far interference to cellular UL transmissions.

Figure 5:
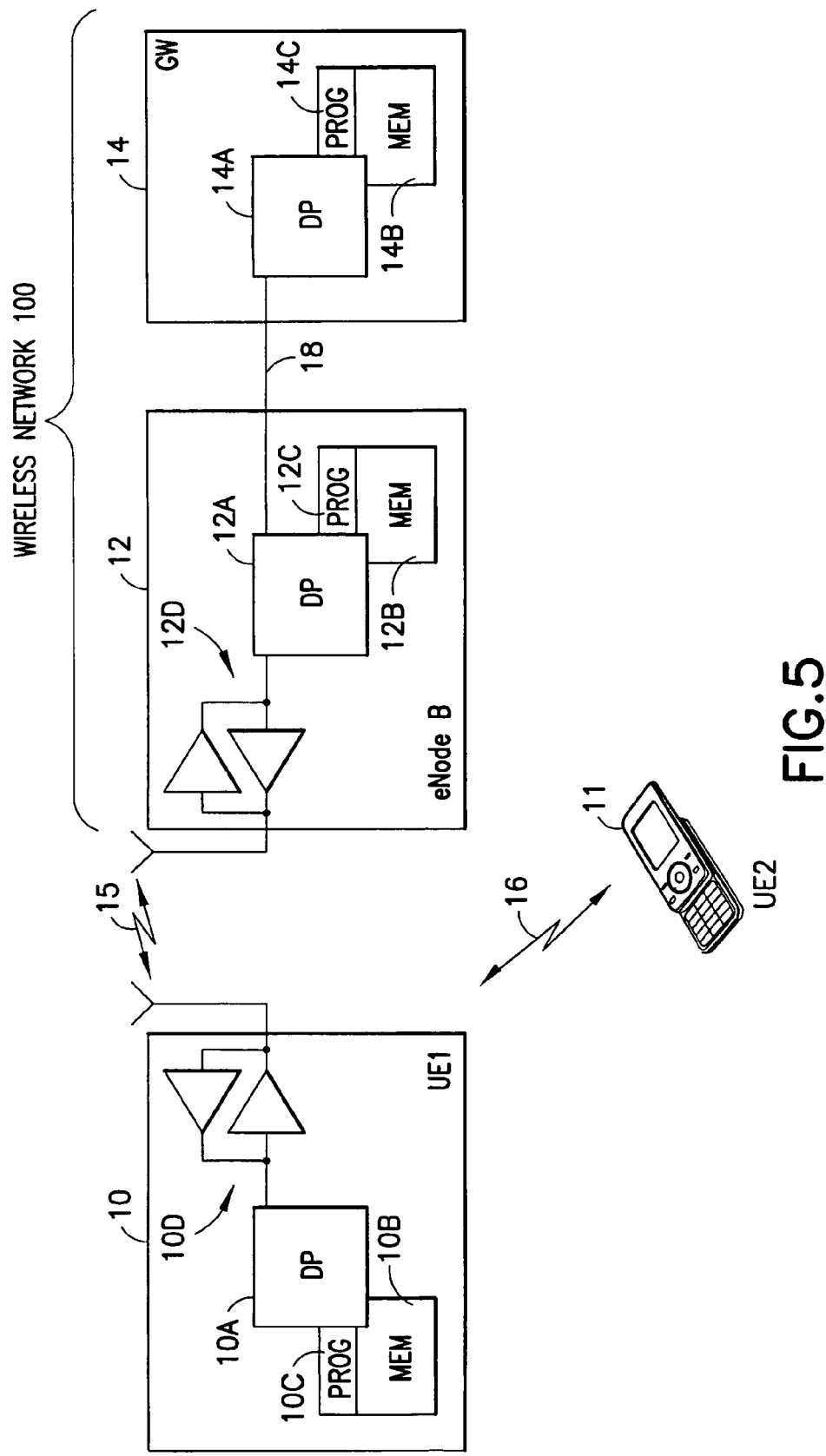
FIG. 5 shows a simplified block diagram of various electronic devices that are suitable for use in practicing the exemplary embodiments of this invention, of which two of the FIG. 5 devices are shown schematically at FIG. 1.

Reference is now made to FIG. 5 for illustrating a simplified block diagram of various electronic devices that are suitable for use in practicing the exemplary embodiments of this invention. In FIG. 5 a wireless network 100 is adapted for communication between a first UE1 10 and an access node 12 (base station), and also between a second UE2 11 and the access node 12. The network may include a gateway GW/serving mobility entity MME/radio network controller RNC 14 or other radio controller function (not shown) known by various terms in different wireless communication systems. The first UE1 10 is detailed but it is understood that the second UE2 11 has similar functionality and in an embodiment also similar structure. The first UE 10 includes a data processor (DP) 10A, a memory (MEM) 10B that stores a program (PROG) 100, and a suitable radio frequency (RF) transceiver 10D coupled to one or more antennas 10E (one shown) for bidirectional wireless communications over one or more wireless links 15 with the BS 12. The UE 10 may have simultaneous communication over the D2D link 16 with the other UE 11, and the BS 12. The simultaneous communication can take place on separate resources, e.g. different frequency blocks or using the same resources utilizing further transceivers and/or antennas. Each of the links can have different or even independent maximum transmit power. The second UE 11 as well as additional UEs (not shown, assumed for a clustered arrangement) are similarly configured as is shown at FIG. 5 for the first UE 10.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

The BS 12 also includes a DP 12A, a MEM 12B, that stores a PROG 12C, and a suitable RF transceiver 12D coupled to one or more antennas 12E. The BS 12 may be coupled via a data path 18 (wired or wireless) to the Internet, a mobile switching center, or other broader network, which may be via a serving or other GW/MME/RNC 14. If present, the GW/MME/RNC also includes a DP 14A, a MEM 14B that stores a PROG 14C, and a suitable modem and/or transceiver (not shown) for communication with the BS 12 over the data link 18.

At least one of the PROGs 10C and 12C is assumed to include program instructions that, when executed by the associated DP, enable the electronic device to operate in accordance with the exemplary embodiments of this invention, as detailed above. Inherent in the DPs 10A and 12A is a clock to enable synchronism among the various apparatus for transmissions and receptions within the appropriate time intervals and slots required.

The PROGs 10C and 12C may be embodied in software, firmware and/or hardware, as is appropriate. In general, the exemplary embodiments of this invention may be implemented by computer software stored in the MEM 12B and executable by the DP 12A of the BS 12 and similar for the other MEM 10B and DP 10A of the UE 10 (and the other UEs 11 detailed above), or by hardware, or by a combination of software and/or firmware and hardware in any or all of the devices shown.

In general, the various embodiments of the UE 10, 11 can include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B and 12B may be of any type suitable to the local technical environment and may be implemented using any suitable data storage technology, such as semiconductor-based memory devices, magnetic memory devices and systems, optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multi-core processor architecture, as non-limiting examples.

Figure 6:
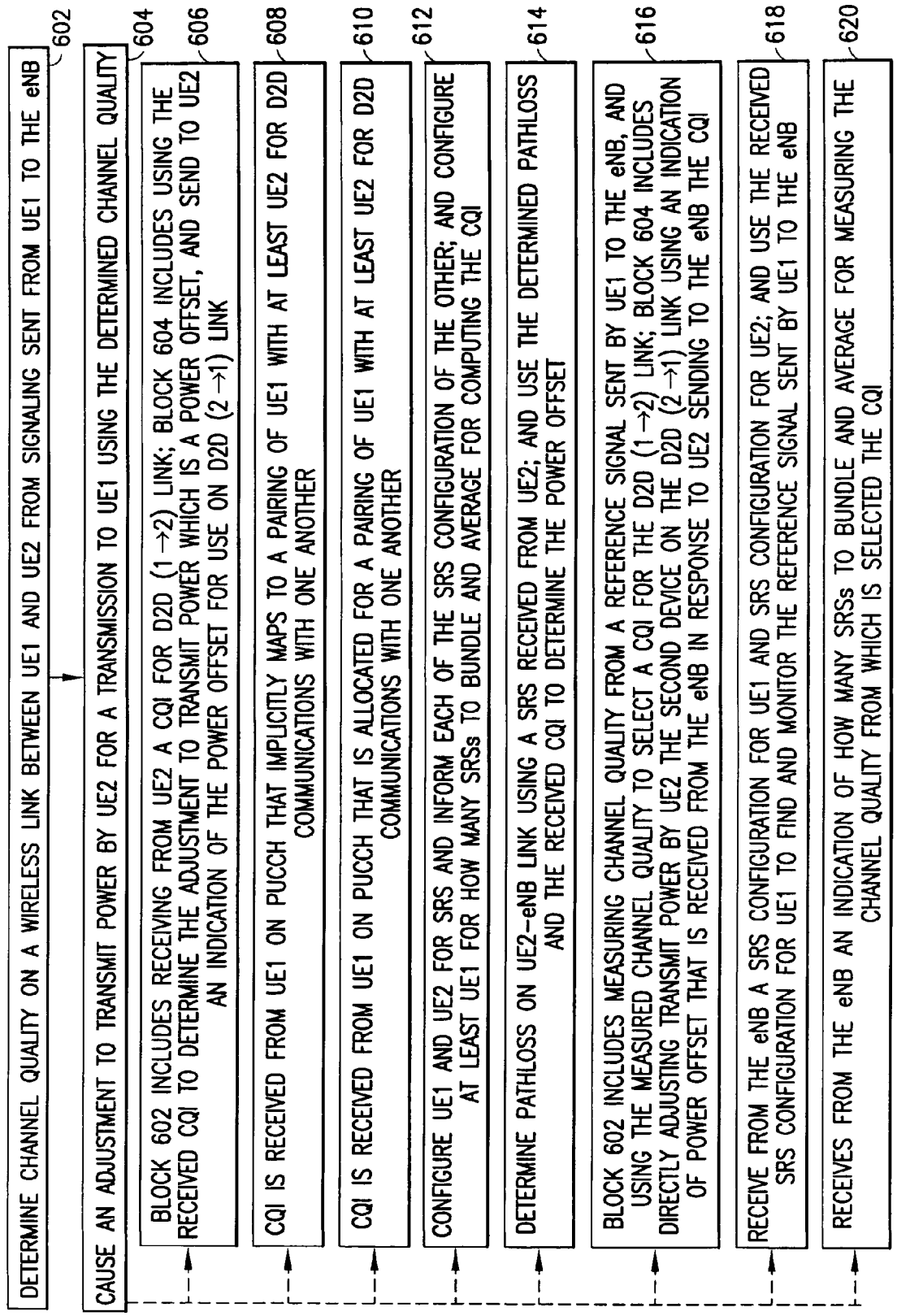

Exemplary process steps are shown at FIG. 6. At block 602 channel quality on a wireless link between a first device and a second device is determined from signaling sent from the first device UE1 to a network access node eNB. At block 604 there is caused an adjustment to transmit power by the second device UE2 for a transmission to the first device UE1 using the determined channel quality.

Dashed lines at FIG. 6 indicate optional steps. Blocks 606, 608, 610, 612 and 614 are each from the perspective of the network access node. From that perspective, determining the channel quality comprises at block 606 receiving from the second device UE2 a channel quality indicator for the wireless link which is a D2D link from the first device UE1 to the second device UE2; and causing the adjustment to the transmit power comprises the network access node eNB using the received channel quality indicator to determine the adjustment to transmit power which is a power offset, and sending to the second device UE2 an indication of the power offset for use on a D2D link from the second device to the first device.

At block 608, the channel quality indicator is received from the first device on a physical uplink control channel PUCCH that implicitly maps to a pairing of the first device with at least the second device for D2D communications with one another.

At block 610 the channel quality indicator is received from the first device on a physical uplink shared channel PUSCH that is allocated for a pairing of the first device with at least the second device for D2D communications with one another.

At block 612 there at the further steps executed by the network node of configuring the first device and the second device for sounding reference signals and informing each of the first and second devices of the sounding reference signal configuration of the other of the first and second device; and configuring at least the first device for how many sounding reference signals to bundle and average for computing the channel quality indicator.

At block 614 the network access node determines pathloss on a link between the network access node and the second device using a sounding reference signal received from the second device; and uses the determined pathloss and the received channel quality indicator to determine the power offset.

Blocks 616, 618 and 620 are from the perspective of the second device. At block 616 determining the channel quality of block 602 comprises measuring channel quality from a reference signal that is sent by the first device to the network node, and using the measured channel quality to select a channel quality indicator for the wireless link which is a D2D link from the first device to the second device. Further at block 616, causing the adjustment to the transmit power at block 604 comprises directly adjusting transmit power by the second device on a D2D link from the second device to the first device using an indication of power offset that is received from the network access node in response to the second device sending to the network access node the channel quality indicator.

At block 618 the second device further receives from the network access node a sounding reference signal configuration for the first device and a sounding reference signal configuration for the second device; and uses the received sounding reference signal configuration for the first device to find and monitor the reference signal that is sent by the first device to the network node.

At block 620 the second device further receives from the network access node an indication of how many sounding reference signals to bundle and average for measuring the channel quality from which is selected the channel quality indicator.

Exemplary process steps for another embodiment of the invention, such as for example from the perspective of a cluster head of two or more devices with D2D links between them, are shown at FIG. 7. At block 702 the cluster head or first device receives from at least one other device with which the cluster head/first device has a wireless device-to-device link, a quality indicator for the respective D2D link observed by the respective other device. For the case in which there are at least two other devices apart from the cluster head, at block 704a the cluster head compiles those received quality indicators into a compressed report. At block 704b the cluster head/first device is part of the D2D cluster, which in an embodiment may include only a total of two devices (cluster head plus one other). In this case at block 704b the cluster head compiles, into the compressed report, the quality indicators received from each of the respective other device or devices along with a respective additional quality indicator or indicators of the respective D2D link or links that are observed by the cluster head/first device. Then at block 706 the cluster head/first device sends the compressed report to a network entity/eNB. In this embodiment, the cluster head receives all of the CQI indicators detailed for messages 410a and 410b in FIG. 4, and compiles those quality indicators into a compressed report which the cluster head sends at block 706 to the eNB, rather than each D2D device separately sending to the eNB its own observed CQI.

In a particular embodiment, each respective additional quality indicator of each of the respective D2D link or links observed by the cluster head/first device is determined at block 708 by listening to a SRS sent by the respective other device or devices to the network entity on a PUCCH as shown at FIG. 4. At block 710 each of those received quality indicators is a single bit, indicating whether quality of the respective link is above or below a threshold. The compressed report of block 706 may include at block 712 an indication of how many of the quality indicators were either above or below the threshold of block 710, but not include the respective quality indicators themselves; or in an embodiment at block 714 the compressed report of block 706 does include the respective quality indicators themselves.

At block 716 the cluster head/first device utilizes the quality indicators to determine whether the respective links can meet quality of service requirements for D2D communications, and/or in another embodiment at block 718 the cluster head/first device utilizes the quality indicators to check connectivity over the respective links, and takes action in response to determining that any of the other devices lacks connectivity over its respective link. Such action includes, by non-limiting example, dropping the respective device from the cluster, or establishing the respective device back in the cluster using new D2D links.

For the case in which there are more than two D2D devices in the cluster meaning at least two other devices apart from the cluster head/first device, then that cluster head/first device also receives at block 720 further quality indicators for D2D links that go between other D2D device pairs that do not include the cluster head/first device. Such further quality indicators are compiled into the compressed report of block 704. The term 'further' quality indicators for these D2D links that do not involved the cluster head is used to distinguish from the 'additional' quality indicators that are for the D2D links between the cluster head itself and any other D2D device. The 'additional' quality indicators are for the D2D links observed by the cluster head directly. In an embodiment the indication at block 712 informs of how many of the total D2D links are above or below the threshold, including additional and further quality indicators. More generally, the quality indicators of FIG. 7 are not limited to only D2D links.

For the aspects of this invention detailed herein by the exemplary embodiments, it should be noted that the various logical step descriptions above and in FIGS. 6-7 as well as in the signaling diagram of FIG. 4 may represent program steps, or interconnected logic circuits of an integrated circuit, blocks and functions, or a combination of program steps and logic circuits, blocks and functions.

In general, the various embodiments may be implemented in hardware or special purpose circuits, software (computer readable instructions embodied on a computer readable medium), logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs which automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Although described in the context of particular embodiments, it will be apparent to those skilled in the art that a number of modifications and various changes to these teachings may occur. Thus, while the invention has been particularly shown and described with respect to one or more embodiments thereof, it will be understood by those skilled in the art that certain modifications or changes may be made therein without departing from the scope of the invention as set forth above, or from the scope of the ensuing claims.

We claim:

1. A method comprising:
receiving, from each of at least two other devices with which a first device has a wireless device-to-device link, a quality indicator for a link observed by the respective other device;
the first device compiling, into a compressed report, the quality indicators received from each of the respective other devices; and
the first device sending the compressed report to a network entity,
wherein each of the received quality indicators comprises only a single bit indicating whether quality of the link is above or below a threshold, where the compressed report comprises an indication of how many of the quality indicators were either above or below the threshold, and the compressed report does not include the respective quality indicators themselves.

2. The method according to claim 1, in which the first device compiles into the compressed report the quality indicators received from each of the respective other devices and an additional quality indicator of each of the links observed by the first device.

3. The method according to claim 1, in which the quality indicator is for a device-to-device link and is determined by the respective other device from listening to a sounding reference signal sent by its pair device to the network entity.

4. The method according to claim 1, further comprising the first device utilizing the quality indicators to determine whether the respective links can meet quality of service requirements for device-to-device communications.

5. The method according to claim 1, further comprising the first device utilizing the quality indicators to check connectivity over the respective links, and to take action in response to determining that any of the other devices lacks connectivity over its respective links.

6. The method according to claim 1, in which the first device is a device cluster head, the method further comprising:
the first device receiving further quality indicators for device-to-device links between the at least two other devices that do not include the first device; and
the first device compiling the further quality indicators into the compressed report.

7. A non-transitory computer readable storage medium storing a program of computer readable instructions that when executed by at least one processor result in actions comprising:
receiving, from each of at least two other devices with which a first device has a wireless device-to-device link, a quality indicator for a link observed by the respective other device;
compiling into a compressed report the quality indicators received from each of the respective other devices, where the compressed report comprises an indication of how many of the quality indicators were either above or below a threshold, and the compressed report does not include the respective quality indicators themselves; and
sending the compressed report to a network entity,
wherein each of the received quality indicators comprises only a single bit indicating whether quality of the link is above or below the threshold.

8. The computer readable storage medium according to claim 7,
in which the first device is a device cluster head, the actions further comprising receiving further quality indicators for device-to-device links between the at least two other devices that do not include the first device;
in which compiling the compressed report comprises compiling the further quality indicators into the compressed report.

9. An apparatus comprising:
at least one processor; and
at least one memory storing computer instructions;
the at least one memory with the computer instructions configured, with the at least one processor, to cause the apparatus at least to:
receive, from each of at least two other devices with which the apparatus has a wireless device-to-device link, a quality indicator for a link observed by the respective other device;
compile into a compressed report the quality indicators received from each of the respective other devices, where the compressed report comprises an indication of how man of the quality indicators were either above or below a threshold, and the compressed resort does not include the respective quality indicators themselves; and
send the compressed report to a network entity,
wherein each of the received quality indicators comprises only a single bit indicating whether quality of the link is above or below the threshold.

10. The apparatus according to claim 9, in which the at least one memory with the computer instructions is configured, with the at least one processor, to cause the apparatus at least to compile into a compressed report the quality indicators received from each of the respective other devices and an additional quality indicator of each of the links observed by the first device.

11. The apparatus according to claim 10, in which the quality indicator is for a device-to-device link, and is determined by the respective other device from listening to a sounding reference signal sent by its pair device to the network entity.

12. The apparatus according to claim 9, in which the at least one memory with the computer instructions are configured, with the at least one processor, to cause the apparatus at least to further utilize the quality indicators to determine whether the respective links can meet quality of service requirements for device-to-device communications.

13. The apparatus according to claim 9, in which the at least one memory with the computer instructions is configured, with the at least one processor, to cause the apparatus at least to further utilize the quality indicators to check connectivity over the respective links, and to take action in response to determining that any of the other devices lacks connectivity over its respective links.

14. The apparatus according to claim 9,
in which the apparatus is a device cluster head,
in which the at least one memory with the computer instructions are configured, with the at least one processor, to cause the apparatus at least to further receive further quality indicators for device-to-device links between the at least two other devices that do not include the device cluster head; and to compile the further quality indicators into the compressed report.

* * * * *

UNITED STATES PATENT AND TRADEMARK OFFICE
CERTIFICATE OF CORRECTION

PATENT NO. : 8,504,052 B2  
APPLICATION NO. : 12/774994  
DATED : August 6, 2013  
INVENTOR(S) : Sami-Jukka Hakola et al.

Page 1 of 1

It is certified that error appears in the above-identified patent and that said Letters Patent is hereby corrected as shown below:

In the Claims

In Claim 9:
Column 16, line 23, "man" should be deleted and --many-- should be inserted.

Signed and Sealed this
Twenty-fourth Day of September, 2013

Teresa Stanek Rea
*Deputy Director of the United States Patent and Trademark Office*